US010682841B2

(12) United States Patent
Nally et al.

(10) Patent No.: US 10,682,841 B2
(45) Date of Patent: Jun. 16, 2020

(54) OPTICAL BONDING MACHINE HAVING CURE IN PLACE AND VISUAL FEEDBACK

(71) Applicant: PRECISION VALVE & AUTOMATION, INC., Cohoes, NY (US)

(72) Inventors: Andrew John Nally, Ballston Spa, NY (US); Alexander M. Giordano, Ballston Lake, NY (US); Edward F. Carey, Ballston Spa, NY (US); Jonathan Neal Urquhart, Saratoga Springs, NY (US)

(73) Assignee: PRECISION VALVE & AUTOMATION, INC., Cohoes, NY (US)

( * ) Notice: Subject to any disclaimer, the term of this patent is extended or adjusted under 35 U.S.C. 154(b) by 343 days.

(21) Appl. No.: 15/585,620

(22) Filed: May 3, 2017

(65) Prior Publication Data

US 2017/0324937 A1    Nov. 9, 2017

Related U.S. Application Data

(60) Provisional application No. 62/331,257, filed on May 3, 2016.

(51) Int. Cl.
*B32B 41/00* (2006.01)
*B29D 11/00* (2006.01)
(Continued)

(52) U.S. Cl.
CPC .............. *B32B 41/00* (2013.01); *B29C 65/48* (2013.01); *B29C 66/90* (2013.01); *B29D 11/00* (2013.01);
(Continued)

(58) Field of Classification Search
CPC . B32B 41/00; B32B 37/003; B32B 17/10807; B32B 2457/20;
(Continued)

(56) References Cited

U.S. PATENT DOCUMENTS 7,364,633 B2    4/2008 Lim et al.
7,819,159 B2    10/2010 Ito et al.
(Continued)

FOREIGN PATENT DOCUMENTS

JP    H05160340 A    6/1993
JP    2005178152 A    7/2005
(Continued)

OTHER PUBLICATIONS

International Search Report and Written Opinion for PCT Application No. PCT/US2017/030774, dated Jul. 13, 2017.
(Continued)

*Primary Examiner* — Michael N Orlando
*Assistant Examiner* — Joshel Rivera
(74) *Attorney, Agent, or Firm* — Schmeiser, Olsen & Watts, LLP

(57) ABSTRACT

An optical bonding machine is provided, including a transparent datum located within the optical bonding machine, wherein the transparent datum supports a first substrate, a robotic placement head configured to pick up a second substrate and place the second substrate into contact with the first substrate, on the transparent datum, a camera disposed proximate the transparent datum, the camera capturing a video of a flow of an optically clear adhesive between the first substrate and the second substrate, and a curing source disposed proximate the transparent datum, the curing source emitting UV rays that pass through the transparent datum and the first substrate to cure an optically clear adhesive between a bonded substrate comprising the first substrate,
(Continued)

the optically clear adhesive, and the second substrate. An associated method is also provided.

20 Claims, 15 Drawing Sheets

(51) Int. Cl.
| | |
|---|---|
| B32B 17/10 | (2006.01) |
| B32B 37/00 | (2006.01) |
| G05B 19/409 | (2006.01) |
| B29C 65/48 | (2006.01) |
| B29C 65/00 | (2006.01) |
| H04N 7/18 | (2006.01) |
| B32B 37/12 | (2006.01) |
| G06N 20/00 | (2019.01) |
| B29L 11/00 | (2006.01) |
| G06T 7/00 | (2017.01) |

(52) U.S. Cl.
CPC ...... *B32B 17/10807* (2013.01); *B32B 37/003* (2013.01); *G05B 19/409* (2013.01); *H04N 7/183* (2013.01); *B29D 11/0073* (2013.01); *B29D 11/00951* (2013.01); *B29L 2011/00* (2013.01); *B32B 37/12* (2013.01); *B32B 37/1284* (2013.01); *B32B 2037/1253* (2013.01); *B32B 2041/04* (2013.01); *B32B 2041/06* (2013.01); *B32B 2307/412* (2013.01); *B32B 2309/70* (2013.01); *B32B 2457/20* (2013.01); *G05B 2219/49032* (2013.01); *G06N 20/00* (2019.01); *G06T 7/0008* (2013.01); *G06T 2207/10016* (2013.01)

(58) Field of Classification Search
CPC ...... B32B 2307/412; B32B 2037/1253; B32B 37/1284; B32B 2309/70; B32B 2041/06; B32B 2041/04; B32B 37/12; G06N 20/00; B29D 11/00; G05B 19/409; G05B 2219/49032; H04N 7/183; B29C 66/90; B29C 65/48; B29C 11/0073; B29C 11/00951; G06T 2207/10016; G06T 7/0008; B29L 2011/00
USPC .......................... 156/64, 350, 351, 378, 379
See application file for complete search history.

(56) References Cited

U.S. PATENT DOCUMENTS

| | | |
|---|---|---|
| 8,764,930 B2 | 7/2014 | Shibata et al. |
| 2008/0216952 A1 | 9/2008 | Yu et al. |
| 2010/0197187 A1 | 8/2010 | Naraba et al. |
| 2011/0292623 A1 | 12/2011 | Stanley |
| 2012/0234459 A1 | 9/2012 | Nally et al. |
| 2014/0158280 A1 | 6/2014 | Kurimura |
| 2014/0182780 A1 | 7/2014 | Jung et al. |
| 2015/0328877 A1 | 11/2015 | Shome et al. |

FOREIGN PATENT DOCUMENTS

| | | |
|---|---|---|
| JP | 2016008985 A | 1/2016 |
| KR | 100878466 B1 | 1/2009 |
| KR | 20160009556 A | 2/2014 |
| KR | 20160022297 A | 6/2014 |

OTHER PUBLICATIONS

European Extended Search Report for application No. 17793233.2 dated Feb. 18, 2019.
Unknown: "Teach Box," Whatis.com. Nov. 17, 2015. XP055554187, Retrieved from the Internet: URL: https://web.archive.org/web/20151117093850/https://whatis.techtarget.com/definition/teach-box Retrieved on Feb. 8, 2019.
Supplementary European Search Report for application No. EP 17 79 3233 completed on Feb. 11, 2019.
English Translation of Japanese Office Action for application No. 2018-565351 dated Apr. 16, 2019.
Non-English Chinese Office Action for application No. 2017800315215 dated Jun. 26, 2019.

OPTICAL BONDING MACHINE HAVING CURE IN PLACE AND VISUAL FEEDBACK

CROSS-REFERENCE TO RELATED APPLICATIONS

This application claims priority to and the benefit of U.S. Provisional Application No. 62/331,257, filed May 3, 2016, and entitled "Optical Bonding Machine," the entire contents of which hereby incorporated by reference.

TECHNICAL FIELD

The following relates to an optical bonding machine, and more specifically to embodiments of an optical bonding machine having cure in place and visual feedback features.

BACKGROUND

Optical bonding involves bonding two substrates together using an optically clear adhesive. An ideal bond does not include the presence of air pockets or other defects between the substrates. To prevent or hinder a formation of air pocket or other defects, the substrates must be bonded together to create a capillary effect of the adhesive sandwiched between the substrates.

SUMMARY

A first aspect relates to an optical bonding machine comprising: a transparent datum, the transparent datum located within an interior region of the optical bonding machine, wherein the transparent datum supports a first substrate, a robotic placement head, the robotic placement head configured to pick up a second substrate and place the second substrate into contact with the first substrate, on the transparent datum, and a camera disposed proximate the transparent datum, the camera capturing a video of a flow of an optically clear adhesive between the first substrate and the second substrate, wherein the video is displayed for providing a real-time visual of the optical bonding process.

A second aspect relates to a optical bonding machine comprising: a transparent datum, the transparent datum located within an interior region of the optical bonding machine, wherein the transparent datum supports a first substrate, a robotic placement head, the robotic placement head configured to pick up a second substrate and place the second substrate into contact with the first substrate, on the transparent datum; and a curing source disposed proximate the transparent datum, the curing source emitting UV rays that pass through the transparent datum and the first substrate to cure an optically clear adhesive between a bonded substrate comprising the first substrate, the optically clear adhesive, and the second substrate, wherein the bonded substrate is cured while remaining on the transparent datum.

A third aspect relates to an optical bonding method comprising: disposing a first substrate on a transparent datum located within an interior region of an optical bonding machine, dispensing an optically clear adhesive on the first substrate, contacting the first substrate and the second substrate, causing the optically clear adhesive to flow between the first substrate and the second substrate, and displaying a video of a flow of the optically clear adhesive between the first substrate and the second substrate.

DETAILED DESCRIPTION

Figure 1:
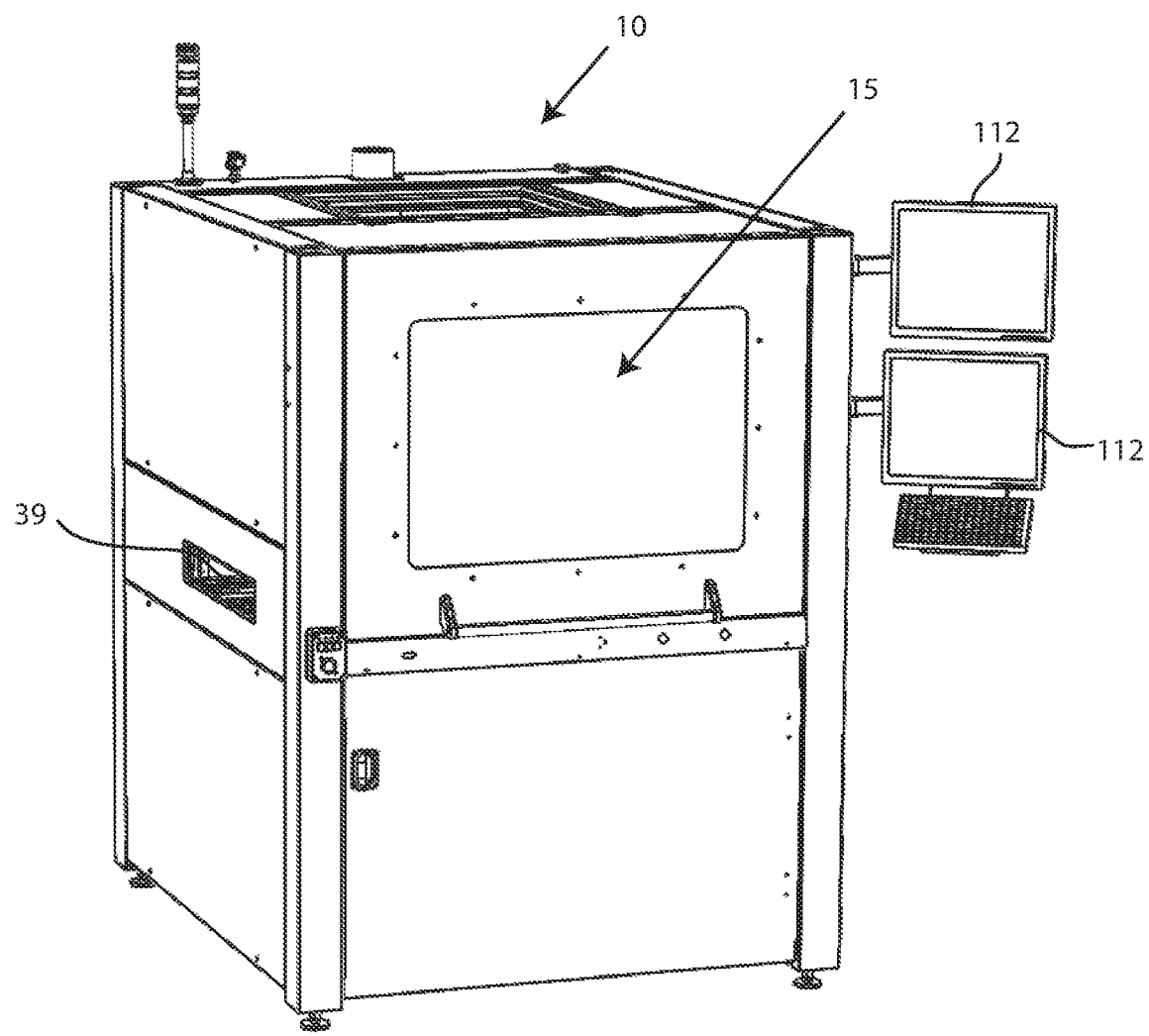
FIG. 1 depicts an optical bonding machine, in accordance with embodiments of the present invention.
Figure 2:
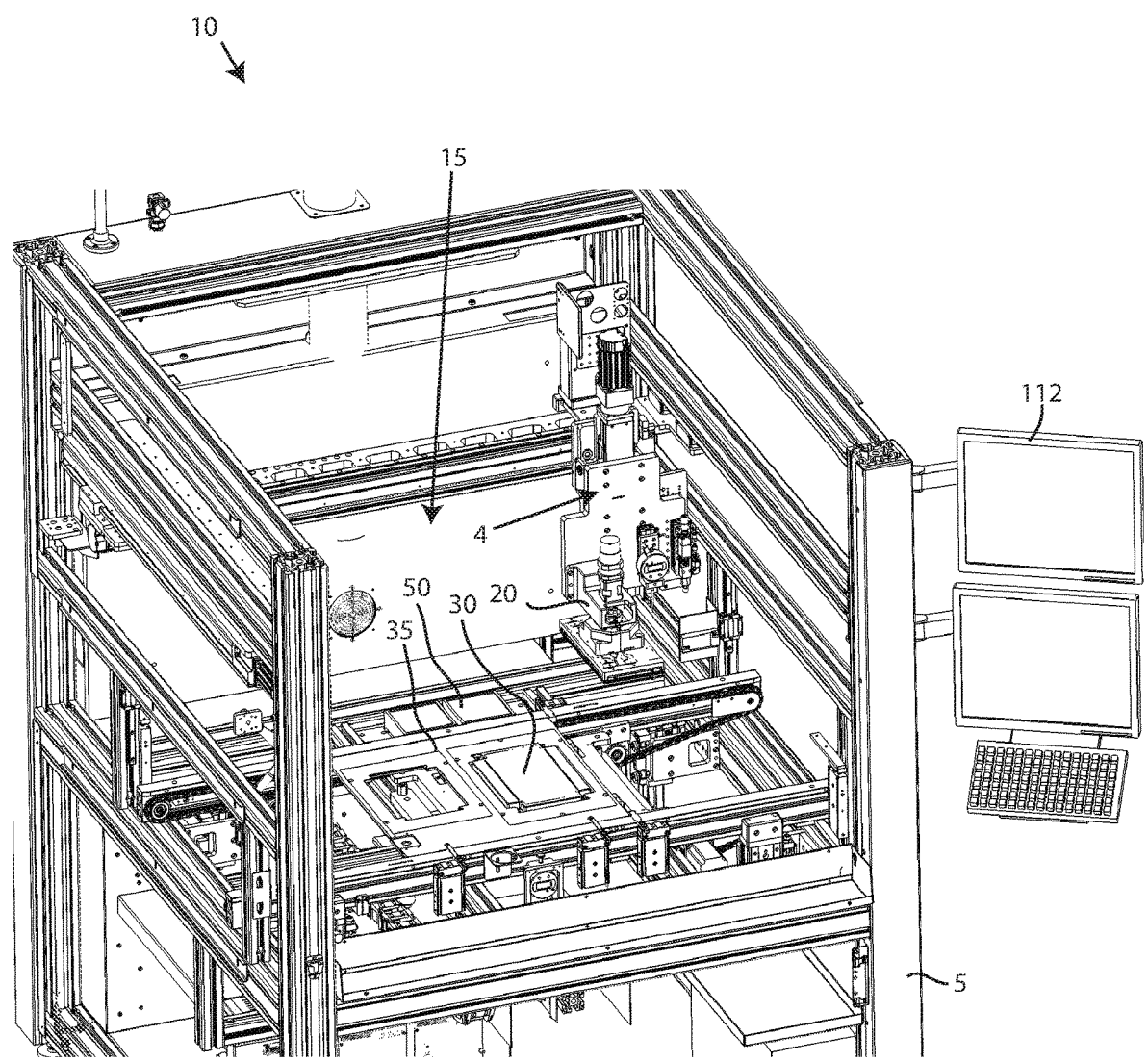
FIG. 2 depicts a perspective view of an interior region of the optical bonding machine, without panels attached to the frame, in accordance with embodiments of the present invention.

Referring to the drawings, FIG. 1 depicts a machine 10. Embodiments of machine 10 may be an optical bonding machine for carrying out an automated process for optically bonding two substrates together. Embodiments of the machine 10 may be an optical bonding system, liquid bonding system, liquid optical bonding system, glass lamination system, a system for bonding two transparent or one transparent and one opaque substrate together, and the like. Machine 10 may perform one or more tasks to accomplish the bonding of two substrates at atmospheric pressure. In other words, the optical bonding performed by machine 10 may be done at atmospheric pressure—without a need to create a vacuum when optically bonding the substrates at one or more phases of the optical bonding process. FIG. 2 depicts a perspective view of an interior region 15 of the machine 10, without panels attached to the frame 5, in accordance with embodiments of the present invention. Embodiments of machine 10 may include a frame 5, an X-axis actuator, a Y-axis actuator, a Z-axis actuator, rotation about Z axis, or further axis, and an end effector 4. The machine 10 may utilize a robotic platform to perform automated tasks with accuracy, precision, and repeatability. For example, the machine 10 may be a Gantry robot a plurality of principal axes (Cartesian coordinates) controlling linear motion, wherein the horizontal member(s) may be supported at both ends. The machine 10 may also be any robotic manipulator such as a selective compliant assembly robot arm (SCARA) system, linear robot, multi-axis robot arm system, and the like. However, an embodiment of the machine 10 is described as utilizing a Gantry robot for exemplary purposes. The end effector 4 may refer to any device(s) attached to a X, Y, Z or other axis of movement to perform a variety of tasks, such as dispensing, picking and placing, routing, and the like. For instance, the end effector 4 is capable of rotation about the Z axis, and may move left and right along the Y axis by sliding along the Y axis actuator, and move back and forth along the X axis by sliding with the Y axis actuator as it slides along the X axis actuator. Embodiments of the end effector 4 may be comprised of a metal, such as stainless steel, or a combination of metal and composite materials, plastics, etc. Additionally, the end effector 4 may move up and down on the Z-axis by sliding along the Z-axis actuator. The X-axis actuator, the Y-axis actuator, and the Z-axis actuator may be a ball screw slide, linear motion slide, a linear actuator, and the like. Moreover, the frame 5 may provide a structure surrounding the components of the machine 10. The frame 5 may allow for panels to be attached providing an enclosure for the machine 10. The panels attached to the frame 5 may be a combination of both solid panels and see-through panels, such as Plexiglas®, glass, plastic, and the like, to allow viewing of the operation of the machine 10.

Embodiments of the machine 10 may include one or more displays 112 operably attached to the machine 100. In an exemplary embodiment, the one or more display 112 is pivotably attached to the frame 5 of the machine 10, wherein the display(s) may be coupled to a computing system (e.g. on board computing system) of the machine. In other embodiments, the display(s) 112 may be located remote from the machine 100, and may wirelessly connect to a computing system (e.g. on board computing system) of the machine 10. Embodiments of the display 112 may be provided in a location that is viewable by an operator operating a controller 112 of the machine 10 during a bonding sequence of the optical bonding process, as described in greater detail infra.

Moreover, embodiments of the machine 10 may include a robotic placement head 20, a datum 30, a carrier 35, a camera 40, and a curing source 50. Embodiments of the machine 10 may include a transparent datum 30, the transparent datum 30 located within an interior region 15 of the optical bonding machine 10, wherein the transparent datum 30 supports a first substrate 1, a robotic placement head 20, the robotic placement head 20 configured to pick up a second substrate 2 and place the second substrate 2 into contact with the first substrate 1, on the transparent datum 30, a camera 40 disposed proximate the transparent datum 30, the camera 40 capturing a video of a flow of an optically clear adhesive between the first substrate 1 and the second substrate 2, and a curing source 50 disposed proximate the transparent datum 30, the curing source 50 emitting UV rays that pass through the transparent datum 30 and the first substrate 1 to cure an optically clear adhesive between a bonded substrate comprising the first substrate 1, the optically clear adhesive, and the second substrate 2.

Figure 3:
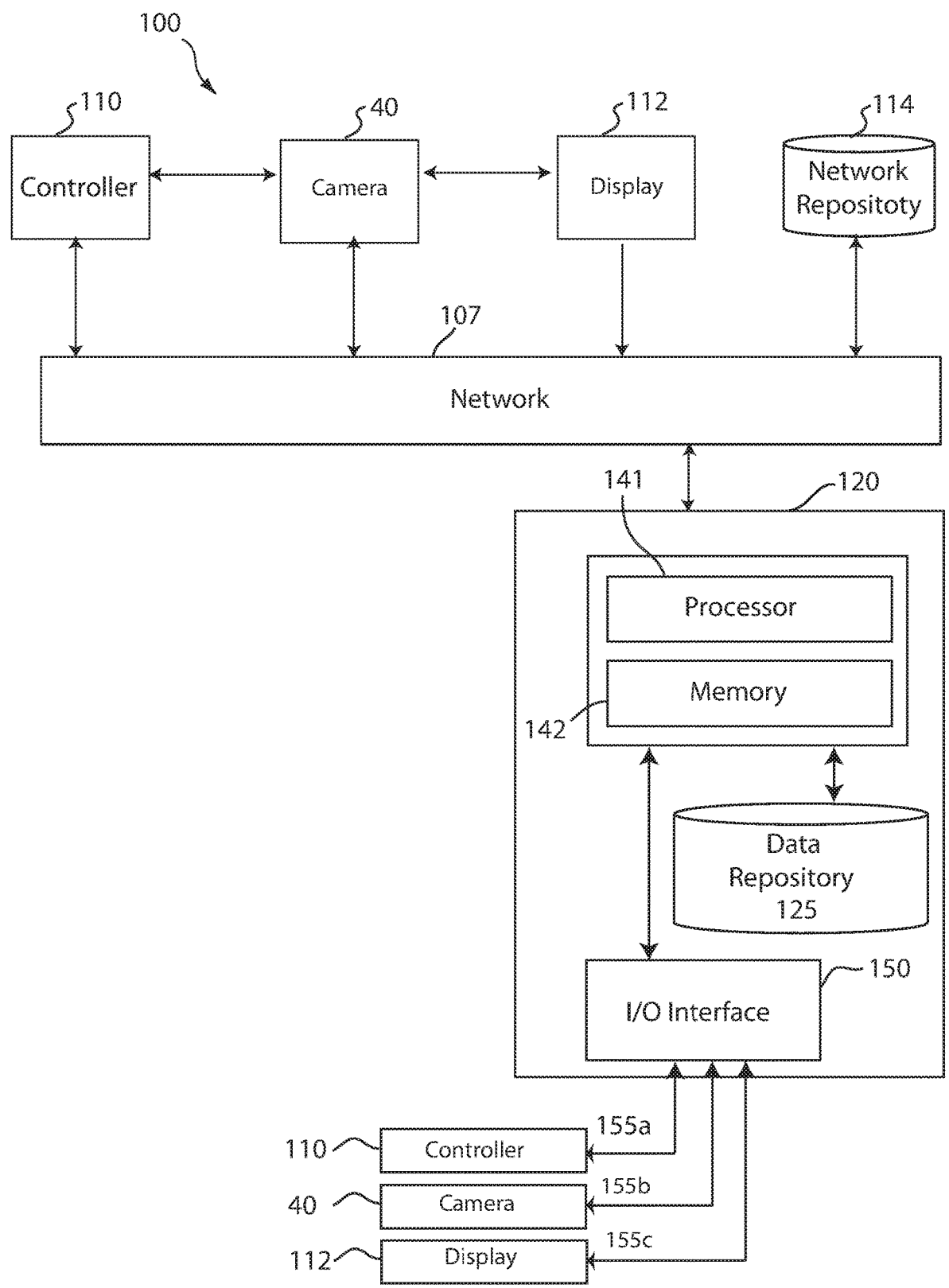
FIG. 3 depicts a block diagram of optical bonding computing system, in accordance with embodiments of the present invention.

FIG. 3 depicts a block diagram of optical bonding computing system 100, in accordance with embodiments of the present invention. Embodiments of the optical bonding computing system 100 may include a computing system 120. Embodiments of the computing system 120 may be an onboard computing system of a machine, such as an optical bonding machine 10. In other embodiments, the computing system 120 may be a server or remote computing system communicatively coupled to an onboard computing system of the machine, wherein the computing system 120 services requests and performs the functions of the optical bonding computing system 100. Embodiment of optical bonding computing system 100 may comprise a controller 110, a camera 40, and a display 112 communicatively coupled to a computing system 120 via an I/O interface 150 and/or over a network 107. For instance, the controller 110, the camera 40, and the display 112 may be connected via an I/O interface 150 to computer system 120. The number of controllers 110, cameras 40, and displays 112 connecting to computer system 120 via data bus lines 155a, 155b (referred to collectively as "data bus lines 155) and/or over network 107 may vary from embodiment to embodiment.

As shown in FIG. 3, the controller 110 may transmit control signals/data (e.g. "machine data" and/or "bonding sequence data") by connecting to computing system 120 via the data bus lines 155 to an I/O interface 150. The camera 40 may transmit image and/or video data ("bonding sequence data) by connecting to computing system 120 via the data bus lines 155 to an I/O interface 150. The display 112 may receive display data to display the bonding sequence data transmitted to the computing system 120 by the camera 40. An I/O interface 150 may refer to any communication process performed between the computer system 120 and the environment outside of the computer system 120, for example, the controller 110, the camera 40, and the display 112. Input to the computing system 120 may refer to the signals or instructions sent to the computing system 120, for example, the controller signals transmitted by the controller 110, while output may refer to the signals sent out from the computer system 120 to the display 112, end effector 4, or other components of the optical bonding machine (e.g. end effector 4, curing source 50, robotic placement head 20 which picks and places the top substrate, etc.).

Alternatively, the controller 110, camera 40, and display 112 may transmit or receive data by connecting to computing system 120 over the network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture. In an exemplary embodiment, network 107 may be an Ethernet network of a machine, such as an optical bonding machine.

In some embodiments, the network 107 may further comprise, in addition to the computer system 120, controller 110, camera 40, and display 112, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging machine data and/or bonding sequence data sent by one or more of the controller 110, camera 40 or received by display 112, to generate both historical and predictive reports regarding a particular bonding sequence for a given application or project. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

With continued reference to FIG. 3, embodiments of the computing system 120 may receive the machine data and/or bonding sequence data from the controller 110 or camera 40 which may be positioned within an interior of the optical bonding machine, on an exterior surface of the machine, remotely, in an environment shared by an operator, or otherwise disposed in a location that can result in obtaining machine data and bonding sequence data. In an exemplary embodiment, the controller 110 may be removably attached to the machine, connected to the computing system 120 via cord, so that an operator may operate the controller 110 with a view of the display 112, which is coupled to the computing system 120. The controller 110 may also be a remote controller connecting to the computing system 120 via network 107, or other wireless network. The camera 40 may be positioned underneath the bottom substrate, while the display 112 may be attached to a frame of a machine.

Figure 4:
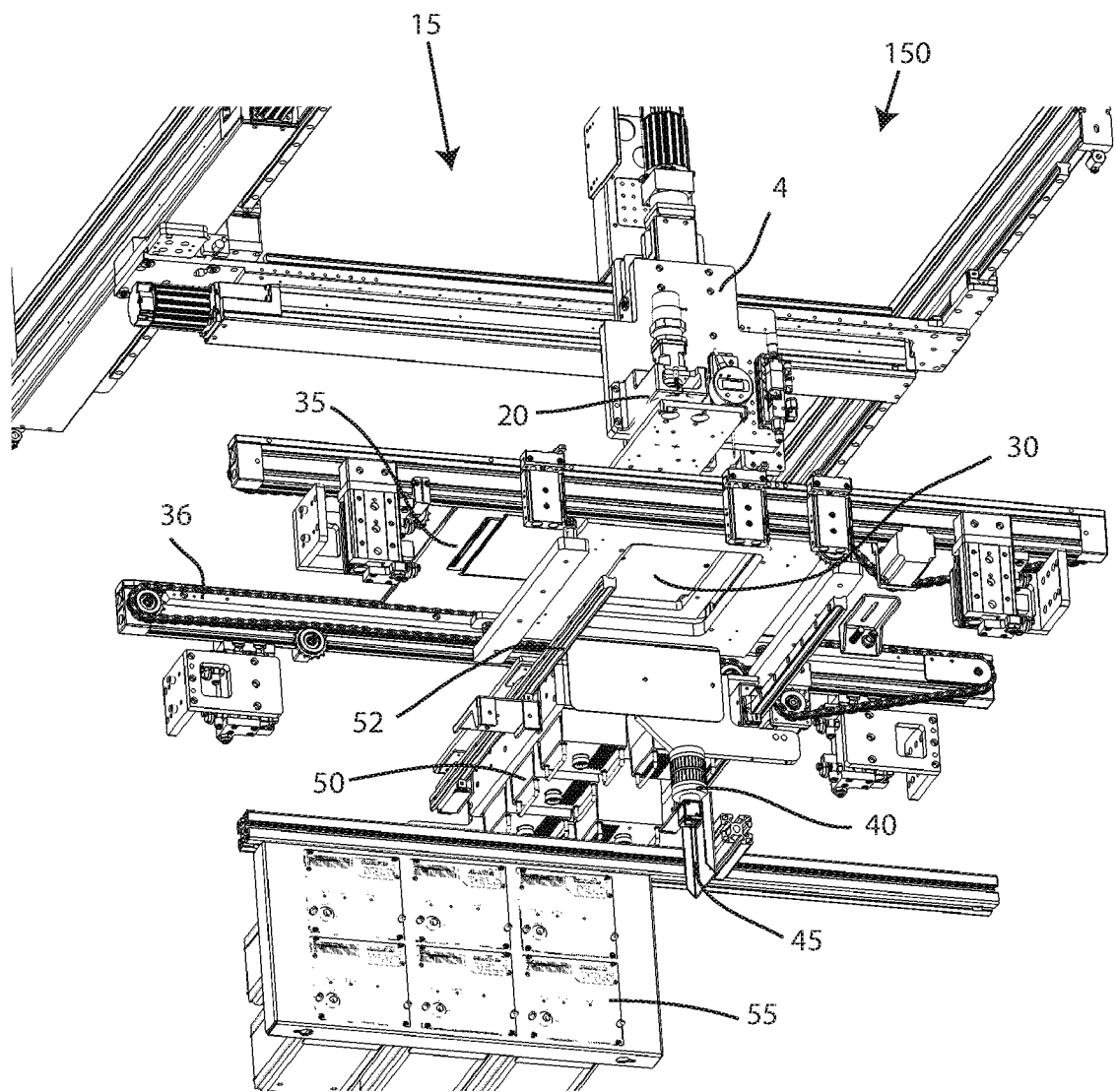
FIG. 4 depicts an interior region of the machine, showing an optical bonding assembly, in accordance with embodiments of the present invention.
Figure 5:
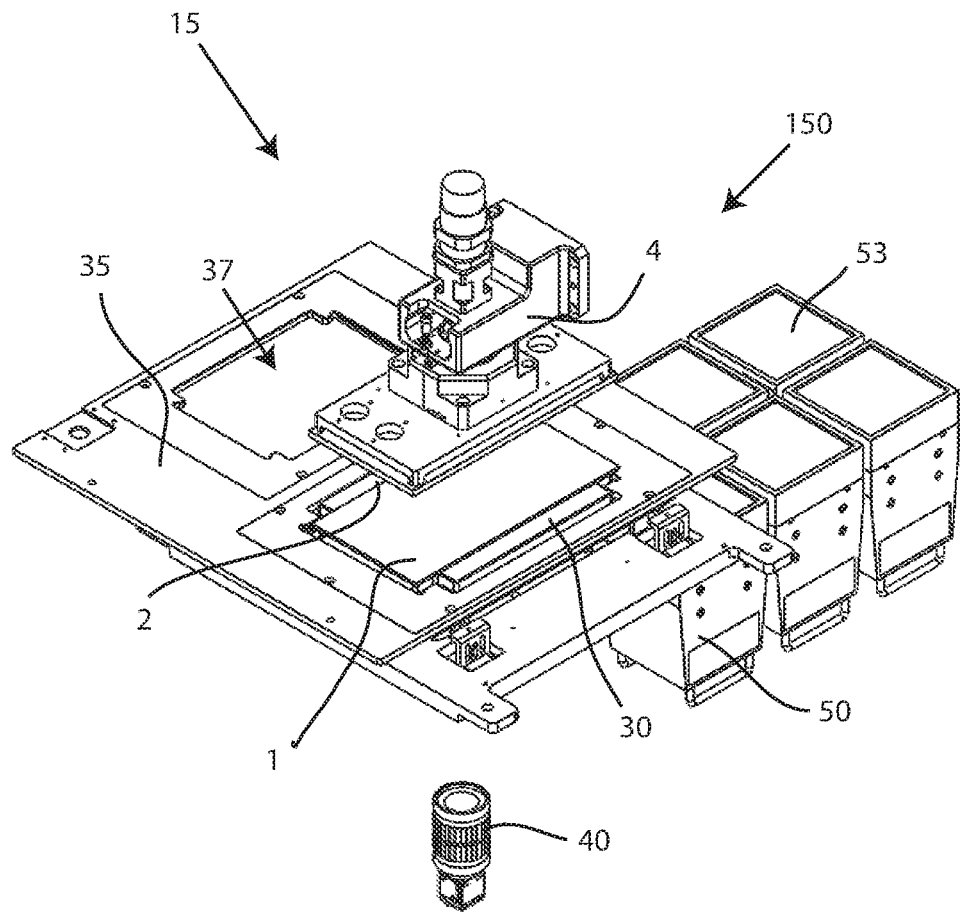
FIG. 5 depicts a schematic view of the optical bonding assembly, in accordance with embodiments of the present invention.
Figure 6:
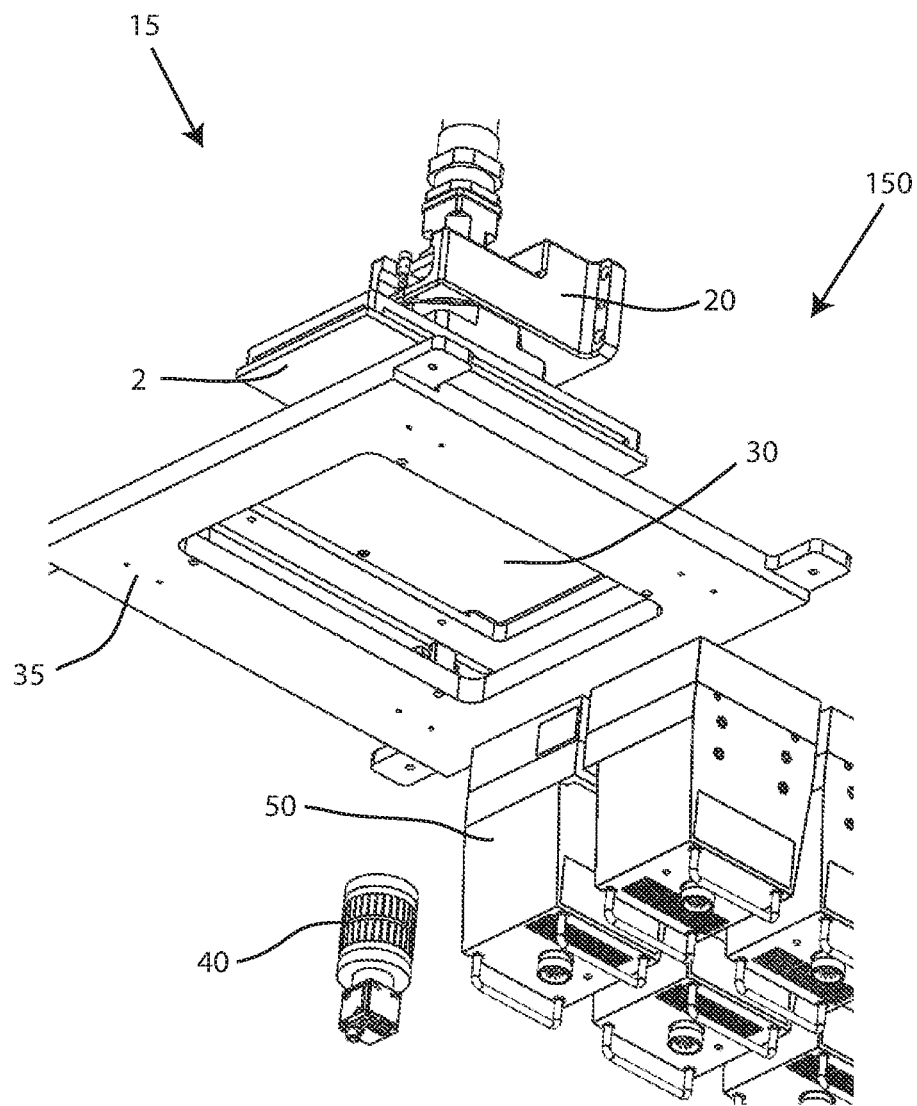
FIG. 6 depicts a schematic view from a perspective underneath the optical bonding assembly, in accordance with embodiments of the present invention.

Referring back to FIG. 2, and with additional reference to FIG. 4, which depicts an interior region 15 of the machine, showing an optical bonding assembly 150, in accordance with embodiments of the present invention. Embodiments of the optical assembly 150 disposed within the machine 10 may include a robotic placement head 20, a datum 30, a carrier 35, a camera 40, and a curing source 50; the assembly 150 may also include additional components, such as tracks, belts, actuators, beams, sensors, and other components, that facilitate an automated optical bonding process. FIG. 5 depicts a schematic view of the optical bonding assembly 150, in accordance with embodiments of the present invention. FIG. 6 depicts a schematic view from a perspective underneath the optical bonding assembly, in accordance with embodiments of the present invention.

FIGS. 2 and 4-6 depict an embodiment of a robotic placement head 20. Embodiments of the robotic placement head 20 may be configured to attach to the end effector 4. The robotic placement head 20 may be used to place a first substrate 1, such as a transparent substrate, onto a second substrate 2, such as another transparent substrate or opaque substrate. Generally, robotic placement head 20 is used for optical bonding and similar glass lamination methods and systems. The robotic placement head 200 may be configured to attach to a robotic platform capable of performing automated tasks with accuracy, precision, and repeatability. For example, robotic placement head 20 may be attached to a Gantry robot, or other robotic manipulator such as a selective compliant assembly robot arm (SCARA) system, linear robot, multi-axis robot arm system, and the like. Furthermore, the robotic placement head 20 may move left and right along the Y axis by sliding along a Y axis actuator, and move back and forth along the X axis by sliding with the Y axis actuator as it slides along the X axis actuator. The X axis actuator may be interchangeable with the Y axis actuator. The X axis actuator and the Y axis actuator may be a ball screw slide, linear motion slide, a linear actuator, and the like. Embodiments of the robotic placement head 20 may be comprised of a metal, such as stainless steel, or a combination of metal and composite materials, plastics, etc.

Moreover, the robotic placement head 20 may pick up the second substrate 2 (which may be positioned in holding area 37 of the carrier 35 next to the first substrate 1) using a vacuum force or mechanical gripper. For example, an underside of the robotic placement head 20 may include one or more suction cups for drawing a vacuum and creating a suction force to secure or grip the second substrate 2. One or more corners of the underside of the robotic placement head 20 may include a chamfered edge and a lip portion that may help align the second substrate 2 when the second substrate 2 is picked up by the robotic placement head 20. After picking up the second substrate 2, the robotic placement had 20 may move to a position above the first substrate 1, and may bring the substrates 1, 2 into contact (e.g. by lowering the second substrate 2 into engagement with the first substrate 1). In other words, the robotic placement head 20 may move in a manner to optically bond the substrates 1, 2 within the machine 10.

Figure 7:
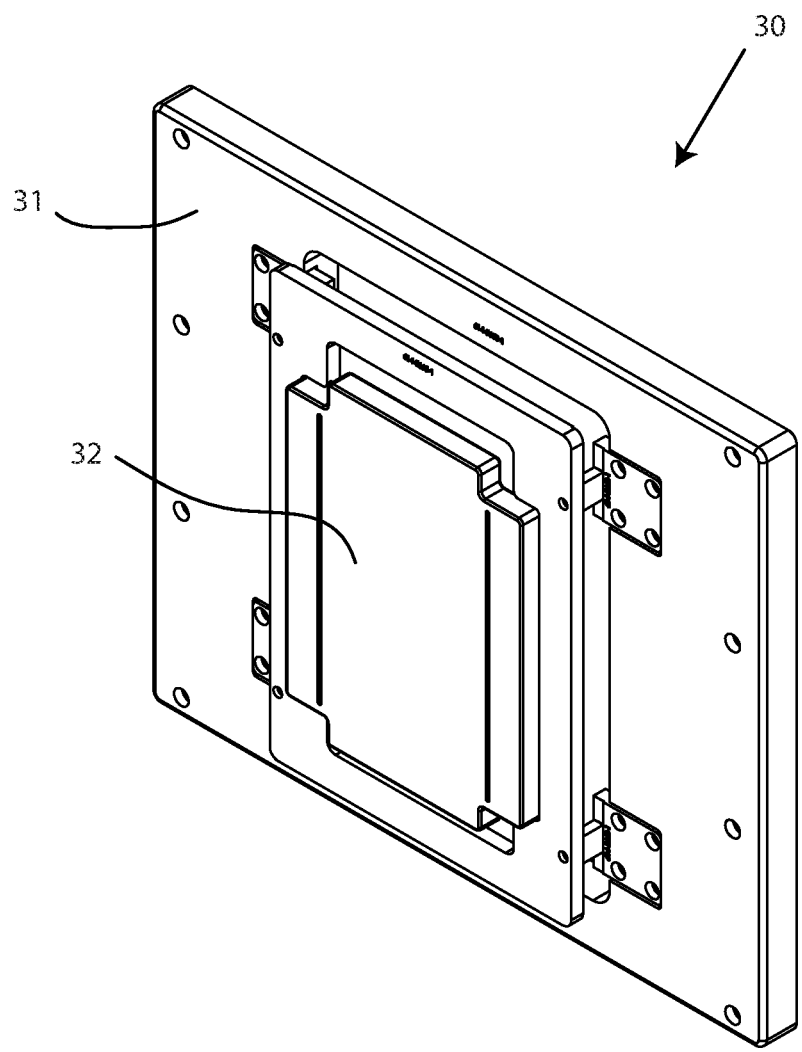
FIG. 7 depicts a perspective view of a datum, in accordance with embodiments of the present invention.

Continuing to refer to FIGS. 2 and 4-6, embodiments of the optical bonding assembly 150 may include a datum 30. FIG. 7 depicts a perspective view of a datum 30, in accordance with embodiments of the present invention. Embodiments of the datum 30 may be a support, a surface, a support surface, a fixed starting point for the optical bonding automated process, a shelf, a datum support structure, and the like. The datum 30 may include a flat surface 32 positioned within the interior region 15 of the machine 10, configured to receive, support, accommodate, etc., a first substrate 1 (e.g. bottom substrate). The datum 30 may transparent so that electromagnetic radiation may generally pass through the datum 30. For example, a camera 40 positioned below the datum 30 may be able to capture video/image(s) of the substrates 1, 2, located above the datum 30 because the datum 30 is transparent. Further, UV rays may pass through the transparent datum 30 to cure the adhesive between the substrates 1, 2 when in a bonded position, which is possible because the datum 30 is transparent. Embodiments of the datum 30 or portions thereof (i.e. datum platform 32) may be comprised of glass or other clear or transparent materials, or a combination thereof. The datum 30 may be stationary and affixed to a general frame or a beam of the machine 10. Embodiments of the datum 30 may include an area 31 surrounding the datum 30, which may be added structural support for positioning the datum 30 within the machine 30; this area 31 may also be transparent or otherwise not transparent. Embodiments of the datum 30 may be raised from the area surrounding the datum 30 to create a datum platform 32 for receiving the first substrate 10 from the carrier 35. The datum platform 32 may cover or extend over a gap or opening proximate the center of the datum 30. Embodiments of the datum platform 32 may be a raised surface, a substrate receiving surface, a substrate support, an optical bonding support surface, and the like.

Referring again to FIGS. 2 and 4-6, embodiments of the optical bonding assembly 150 may include a carrier 35. Embodiments of the carrier 35 or platform 35 may carry or otherwise introduce the first substrate 1 and the second substrate 2 into the interior region 15 of the machine 10. Embodiments of the carrier 35 may include two holding areas; one holding area 37 is shown in FIG. 5, wherein the second substrate 2 has been picked up from the holding area 37 of the carrier 35 by the robotic placement head 20. The holding area 37 may receive, hold, retain, support, temporarily, one of the substrates 1, 2, while another holding area 37 located on the same carrier 35 receives, holds, retains, supports, temporarily, the other substrate 1, 2. The carrier 35, proximate the holding area 37, may include a lip, edge, finger, and the like, that may extend into a central opening to create a support surface for engagement with the substrate 1, 2. In an exemplary embodiment, the substrate 1, 2 is held into the holding area 37 by gravity (i.e. engagement between a edge of the substrate 1, 2 and a finger, lip, shelf, etc. of the carrier 35), whereby the vacuum force of the robotic placement head 20 in an opposite direction may be sufficient to disengage the substrate 1, 2 from the carrier 35.

Embodiments of the substrates 1, 2 may be transparent substrates. For example, the substrates 1, 2 may be a glass sheet, a cover glass, a protective glass, a display, an electrically active glass substrate, a capacitive screen, a glass substrate having a thin film matrix (TFT), a substrate having circuitry, and the like. The substrates 1, 2 may be bonded to form an electrically active glass substrate having a protective cover glass substrate for a smartphone, tablet computer, car console display, heads up display (HUD), computing device, televisions, computer screen, and the like. In an exemplary embodiment, the first substrate 1 may be the electrically active glass piece and the second substrate 2 may be the protective cover glass for the electrically active glass piece.

Figure 8:
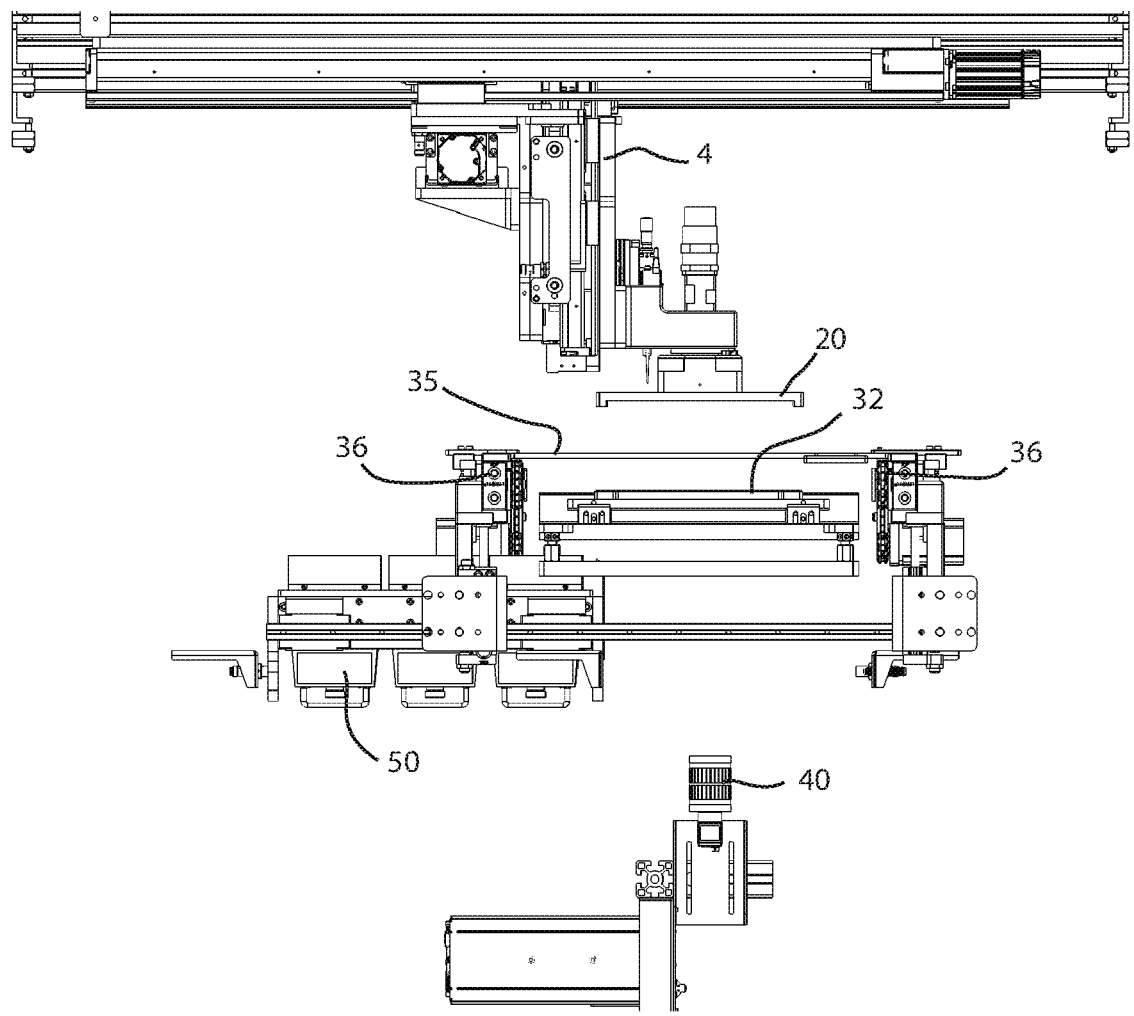
FIG. 8 depicts an elevated position of the carrier, in accordance with embodiments of the present invention.
Figure 9:
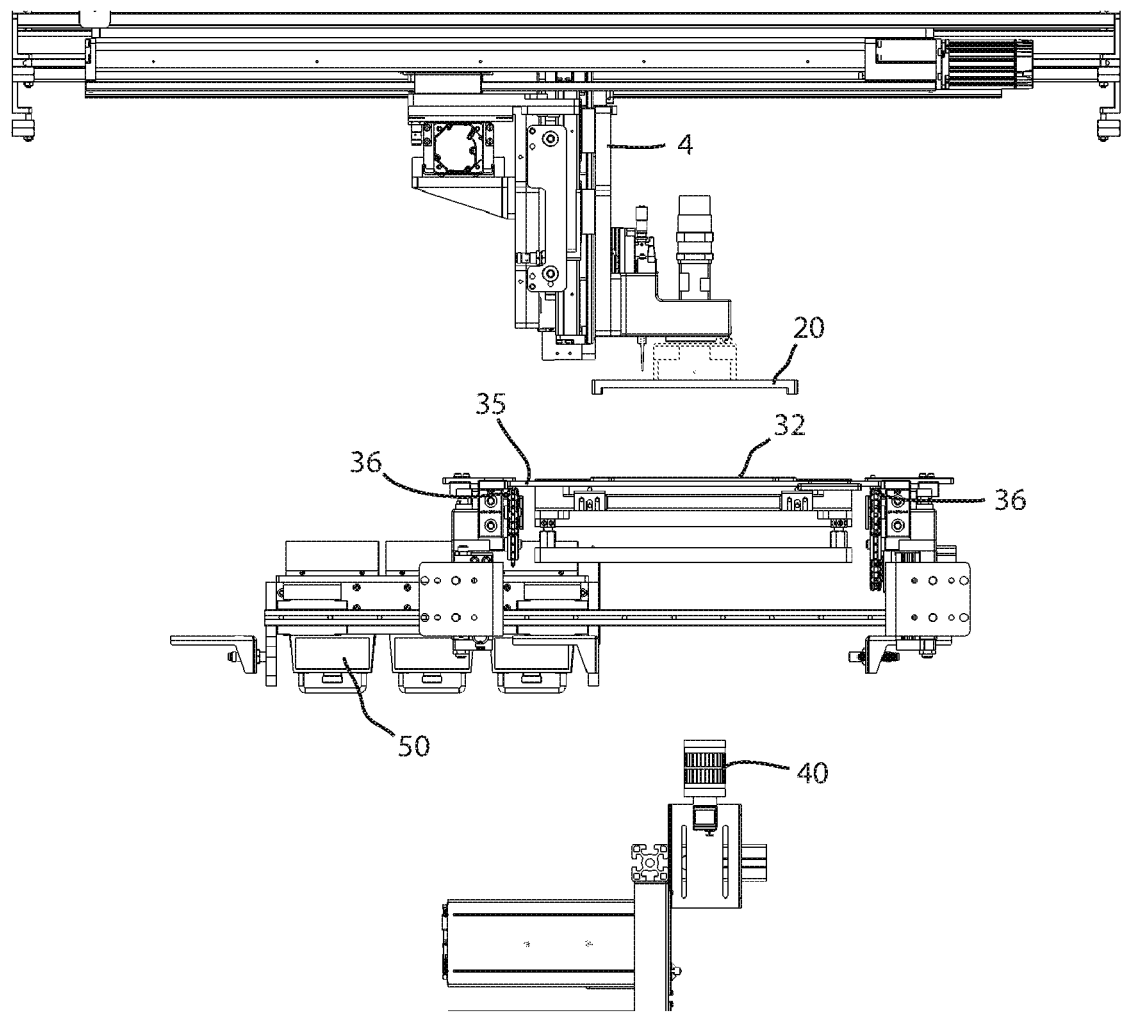
FIG. 9 depicts a lowered position of the carrier, in accordance with embodiments of the present invention.

The substrates 1, 2 may be set into position within the machine 100 by movement and/or actuation of the carrier 35. The carrier 35 may move along a track 36 from a first position to a second position. In the first position, the carrier 35 is away from the datum 30, proximate an access point 39 (shown in FIG. 1) into the machine 10. In this first position, the first substrate 1 and the second substrate 2 may be loaded or placed onto the carrier 35, within the holding area 37. For instance, while the carrier 35 is proximate (or retrieved from) the access point 39 in the first position, an operator may load the substrates 1, 2 into the holding areas 37 of the carrier 35. Further, in the first position, the track 36 may be in an elevated position, as shown in FIG. 8. FIG. 8 depicts an elevated position of the carrier 35, in accordance with embodiments of the present invention. To achieve an elevated position, an actuator coupled to the one or both tracks 36 may cause the track to be lifted. The elevated position allows the carrier 35 to pass over the datum 30 when moving from the first position to the second position over the datum 30. FIG. 9 depicts a lowered position of the carrier 35, in accordance with embodiments of the present invention. An actuator may cause the tracks 36 to be lowered, such that the carrier 35 is lowered over the datum 30. As the carrier 35 is lowered over/onto the datum 30, the datum platform 32 may engage the first substrate 1 and disengage the first substrate 1 from the carrier 35. The carrier 35 may continue to be lowered into a final position, and the first substrate 1 may be retained and/or supported by the datum platform 32. In an exemplary embodiment, the raised datum platform 30 may pass through the opening of the holding area 37 and clear any fingers, ledges, lips, supports, etc., extending inwardly into the general opening of the holding area 37. In other embodiments, the datum 30 may include notches that may receive the fingers, ledges, lips, supports, etc. as the carrier 35 is lowered into the final position. Accordingly, in a final position of the carrier 35 (before optical bonding of the two substrates 1, 2 begins), the first substrate 1 is positioned on the datum platform 32, wherein the second substrate 2 may be located in the holding area 37 of the carrier 35, proximate to the datum 30, awaiting to be picked up by the robotic placement head 20. Embodiments of the datum 30 may include one or more openings, holes, bores, and the like, that allow a suction force to be drawn in to help retain the first substrate 1 into position for optical bonding. Mechanical gripping is also possible.

In alternative embodiments, the datum 30 may be raised and lowered, while the carrier 35 moves linearly from a first position to a second position. The datum 30 being raised upwardly similarly engages the first substrate 1 and disengages the first substrate 1 from the holding area 37 of the carrier 35, and the rest of the carrier may rest on a surrounding area 31 of the datum 30.

Referring back to FIGS. 2 and 4-6, embodiments of the optical bonding machine 10 may include a camera 40. Embodiments of camera 40 may be disposed within the interior region 15 of the machine 10. In an exemplary embodiment, the camera 40 may be disposed underneath the datum 30. The camera 40 may be affixed to one or more frame members, such as camera support member 45, of the machine 10, and may have a cover or enclosure surrounding the camera 40, wherein an opening of the enclosure allows a lens of the camera 40 to capture images and/or video in real-time of the datum 30, and essentially the optical bonding process. Embodiments of the camera 40 may be coupled to the computing system 120, as shown in FIG. 1. Moreover, embodiments of the camera 40 may be used to provide a real-time visual feedback to an operator on display 112, as the first substrate 1 and the second substrate 2 are being bonded together. For instance, the camera 40 may capture in real-time the flow of the adhesive between the substrates 1, 2 as the robotic placement head 20 places the second substrate 2 on the first substrate 1, which is possible because the datum platform 32 is transparent, as well as the substrates 1, 2. In other words, the camera 40 positioned underneath the datum 30 may provide an operator a visual indicator of the progression of the adhesive/fluid as the substrates are optically bonded.

The visual feedback displayed on display 112, may be provided/displayed for each optical bond carried out by the optical bonding machine 10, which may be monitored for imperfections or defects, such as a presence of air pockets, debris, etc. The computing system 120 may analyze the video for imperfections and may automatically detect a presence of defects, such as air pockets, debris, etc., and cause the automated process to either stop or forego the curing step which occurs after the optical bonding. In other embodiments, an operator may watch the display 112 to inspect the optical bond for imperfections.

Figure 10:
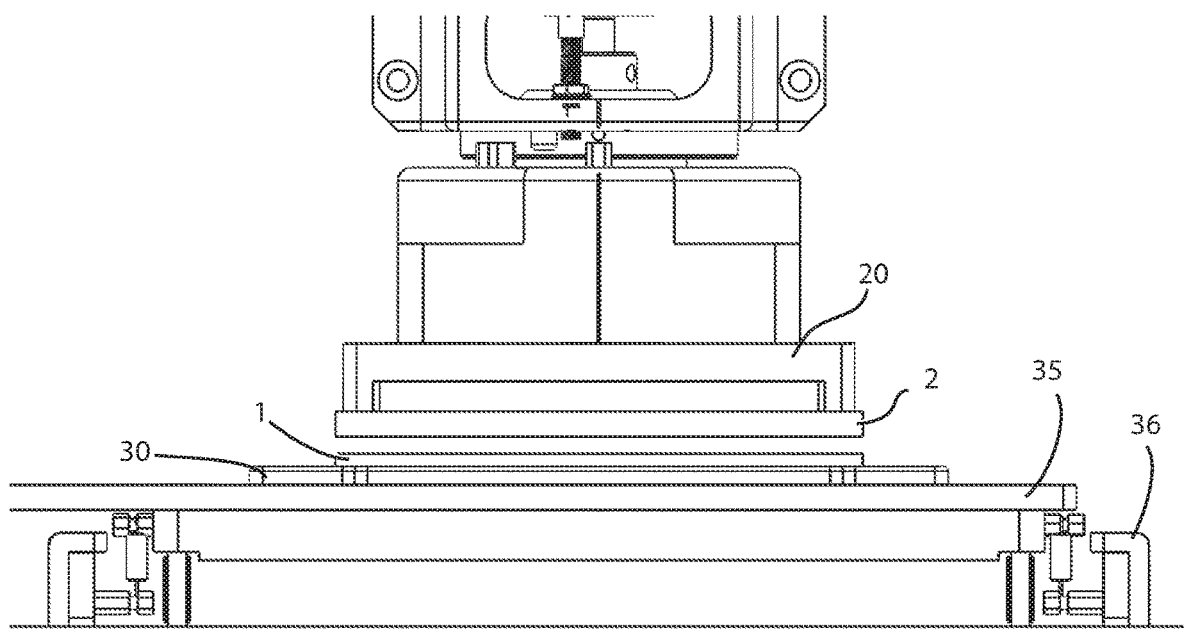
FIG. 10 depicts a close proximity between the first substrate and the second substrate, during an optical bonding process, in accordance with embodiments of the present invention.
Figure 11:
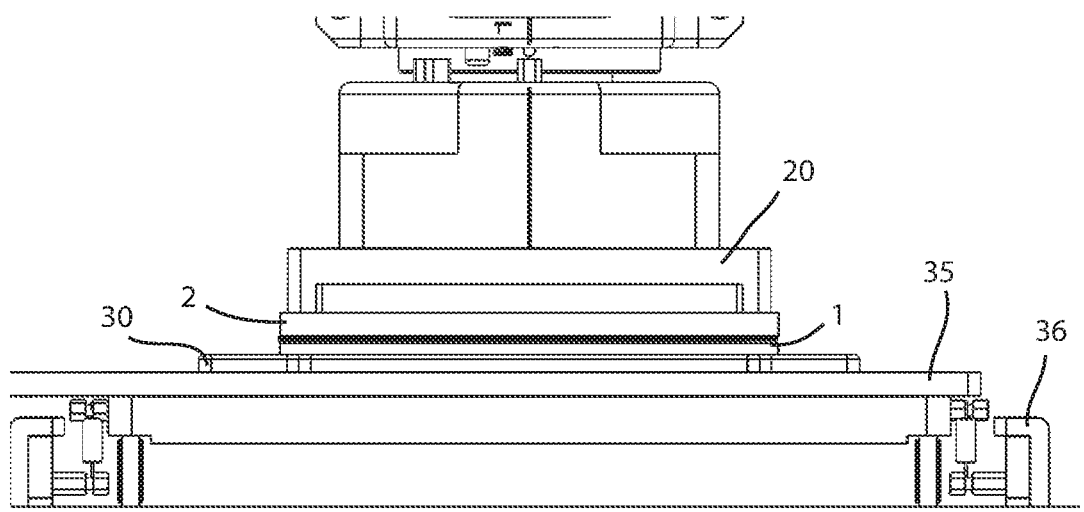
FIG. 11 depicts the substrates in an optically bonded position, in accordance with embodiments of the present invention.

Additionally, the data captured by the camera 40 and displayed on the display 112 may also be useful when an operator is manually operating a controller 110 to effectuate an ideal or proper optical bond. For instance, the computing system 120 may detect that a first substrate 1 is in close proximity with the second substrate 2 (or vice versa), during an optical bonding operation. FIG. 10 depicts a close proximity between the first substrate 1 and the second substrate 2, during an optical bonding process, in accordance with embodiments of the present invention. Close proximity may mean that a small gap exists between the first substrate 1 and the second substrate 2, wherein an adhesive material, such as an optically clear adhesive, dispensed on the first substrate 1 has yet to come into contact with an adhesive material on the second substrate 2 (e.g. a dot of adhesive on the underside of the second substrate). The gap between the first substrate 1 and the second substrate 2 may be smaller or significantly smaller than the gap between the substrates 210, 211 shown in FIGS. 5-6. The gap when in close proximity may be several millimeters or larger. Embodiments of the computing system 120 may detect when the robotic placement head 20, with the second substrate 2 retained, advanced close enough to the datum 30, to determine that a close proximity exists. In an exemplary embodiment, the movement of the robotic placement head 20 is pre-programmed to automatically reach a close proximity, and in response to arriving at a location of close proximity, the computing system 120 may stop the movement of the robotic placement head 20. In another exemplary embodiment, the computing system 120 may confirm that substrates 1, 2 are in close proximity by scanning the area surrounding the first substrate 1, and transmitting a signal to the computing system 120 to cease movement of the robotic placement head 20 in response to a detection of a lead edge of the second substrate 2. Accordingly, the computing system 120 causes the robotic placement head 20 to remain in a position where the first substrate 1 and the second substrate 2 are in close proximity, and the automated process of the optical bonding machine is suspended, stopped, ceased, or temporarily suspended or stopped. In response to the stoppage of the automated process, the computing system 120 may prompt an operator to take controls of the controller 110 to control the movement of the robotic placement head 20 to close the distance between the first substrate 1 and the second substrate 1 to effectuate a proper optical bond without formation of air pockets, as shown in FIG. 11, which depicts the substrates 1, 2 in an optically bonded position, in accordance with embodiments of the present invention.

Figure 12A:
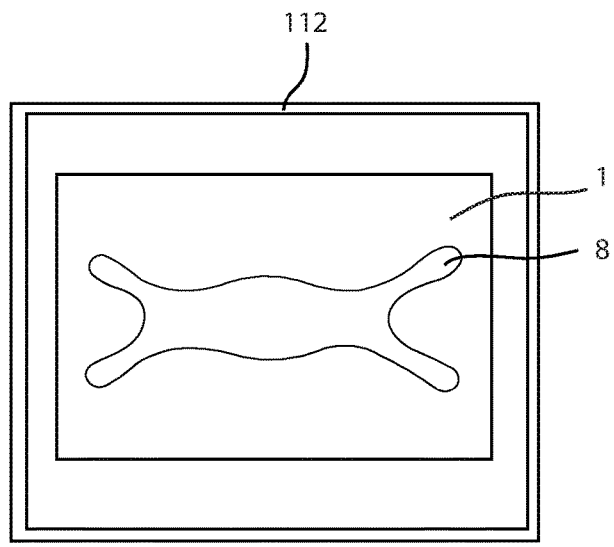
FIG. 12A depicts an image of a video captured by the camera, wherein the adhesive on either substrate has not come into contact, in accordance with embodiments of the present invention.
Figure 12B:
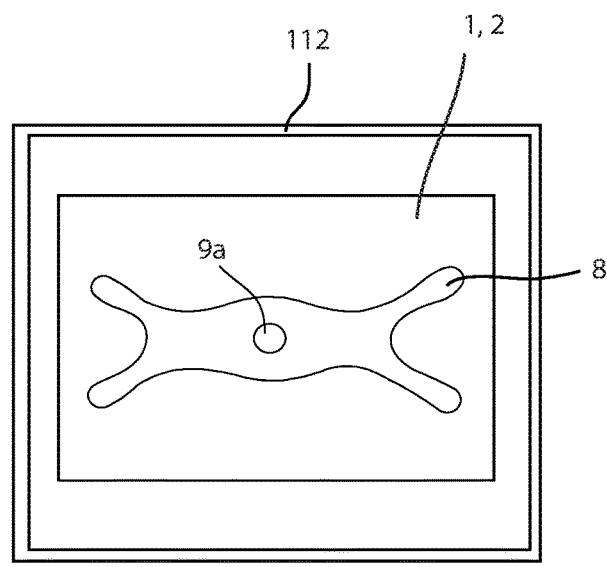
FIG. 12B depicts an image of a video captured by the camera, wherein an initial contact has been made during the optical bonding process, in accordance with embodiments of the present invention.
Figure 12C:
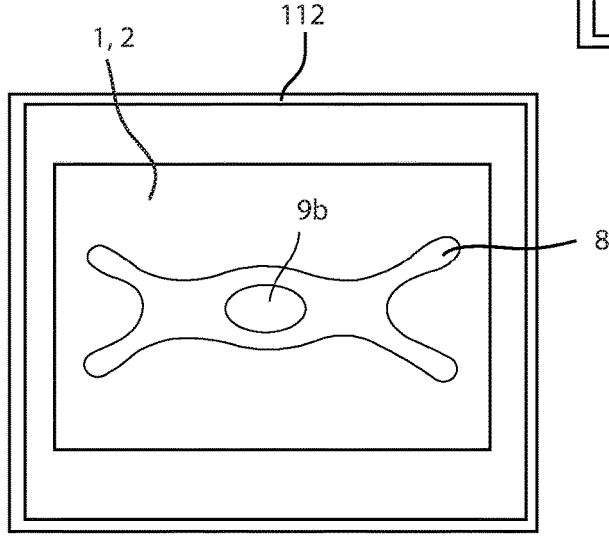
FIG. 12C depicts an image of a video captured by the camera showing an adhesive progression of the adhesive across the substrates, in accordance with embodiments of the present invention.

As the operator controls the robotic placement head 20 to effectuate an optical bond, the camera 40 may be capturing a real-time feed of the adhesive fill reaction, from underneath the transparent datum 30. The camera 40 may transmit the real-time feed to the computing system 120, which may then transmit the feed signal to the display 112. The operator may receive live feedback by viewing the display 112 to ensure a proper wavefront progression of the adhesive during contact and eventual bonding. FIG. 12A depicts an image of a video captured by the camera, wherein the adhesive 8 on either substrate has not come into contact, in accordance with embodiments of the present invention. FIG. 12B depicts an image of a video captured by the camera, wherein an initial contact 9a has been made during the optical bonding process, in accordance with embodiments of the present invention. The initial contact may be an adhesive-to-adhesive contact of an adhesive dispensed on the first substrate 1 and a dot of adhesive placed on a center of the second substrate 2. FIG. 12C depicts an image of a video captured by the camera showing an adhesive progression 9b of the adhesive across the substrates 1, 2, in accordance with embodiments of the present invention. The adhesive progression 9b may be a wavefront progression, exhibiting a capillary effect as the fluid/adhesive continues to flow and spread out across the substrates 1, 2 until a desired area is covered by the adhesive. Thus, an operator may utilize the real-time feedback of the adhesive flow progression to influence the operator's decisions and/or movements input into a controller 110, the sequence of which may be saved and then used as automatic bond sequence in subsequent applications.

Referring back to FIGS. 4-6, embodiments of the optical bonding machine 10 may include a curing source 50. Embodiments of curing source 50 may be disposed within the interior region 15 of the machine 10. In an exemplary embodiment, the curing source may be disposed underneath the datum 30. The curing source 50 may be a UV light source for curing the adhesive used in the optical bonding process. In an exemplary embodiment, the UV light source may be a LED array configured to emit UV light rays towards the bonded substrates 1, 2, through the datum glass, in the same interior region 15 of the machine 10 as where the substrates were bonded. In other embodiments, the curing source 50 may be a UV light array, a UV light source, a microwave source, or other curing sources. Moreover, the curing source 50 may be electrically coupled to a curing source controller 55. Embodiments of the curing source controller 55 may be a power source for the curing source 50, and may also control curing properties, such as light intensity, duration, etc., during the curing process. Embodiments of the curing source 55 may also be coupled to the computing system 120.

Figure 13:
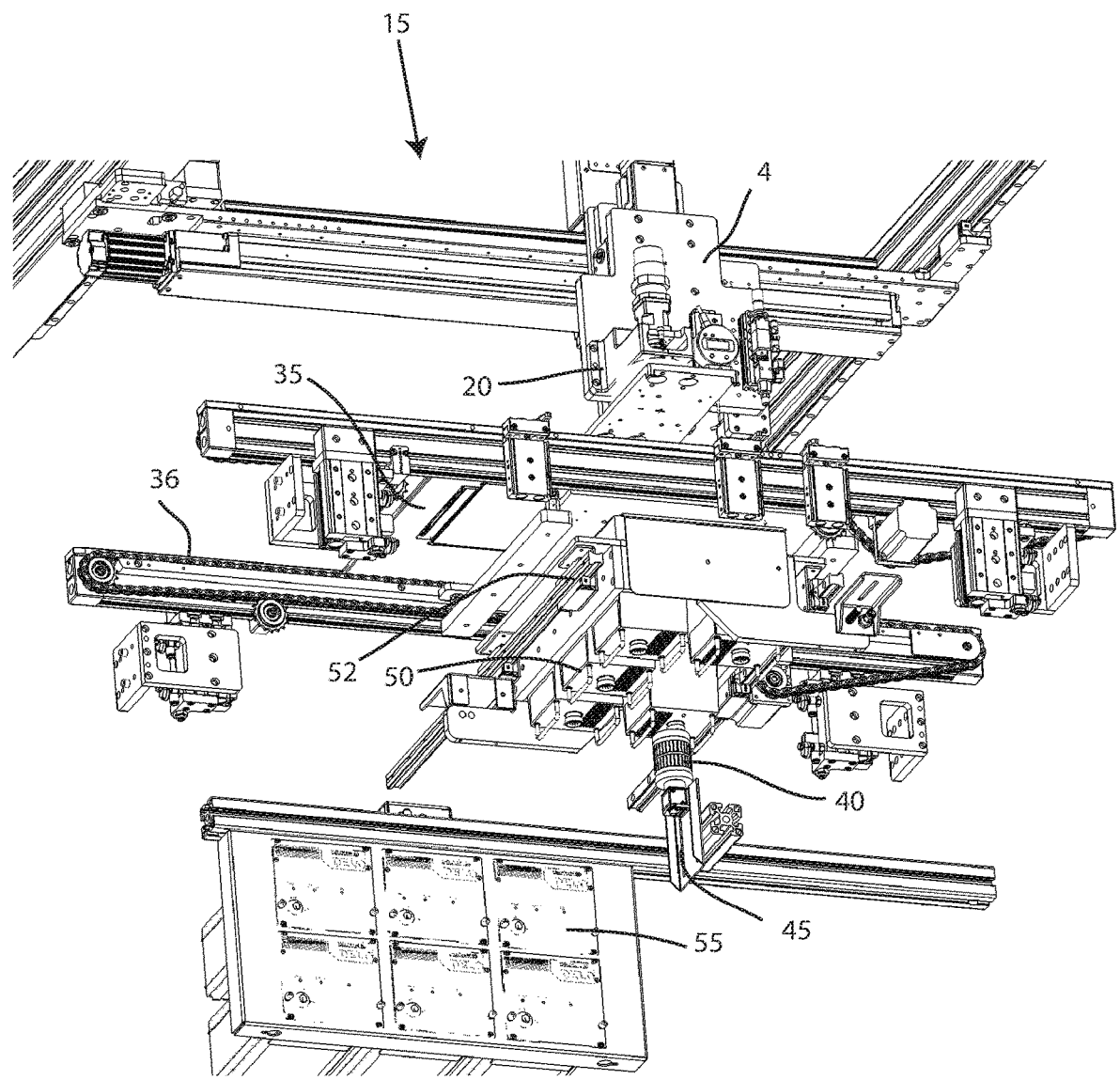
FIG. 13 depicts a perspective view from underneath the optical bonding assembly of the curing source in a curing position, in accordance with embodiments of the present invention.
Figure 14:
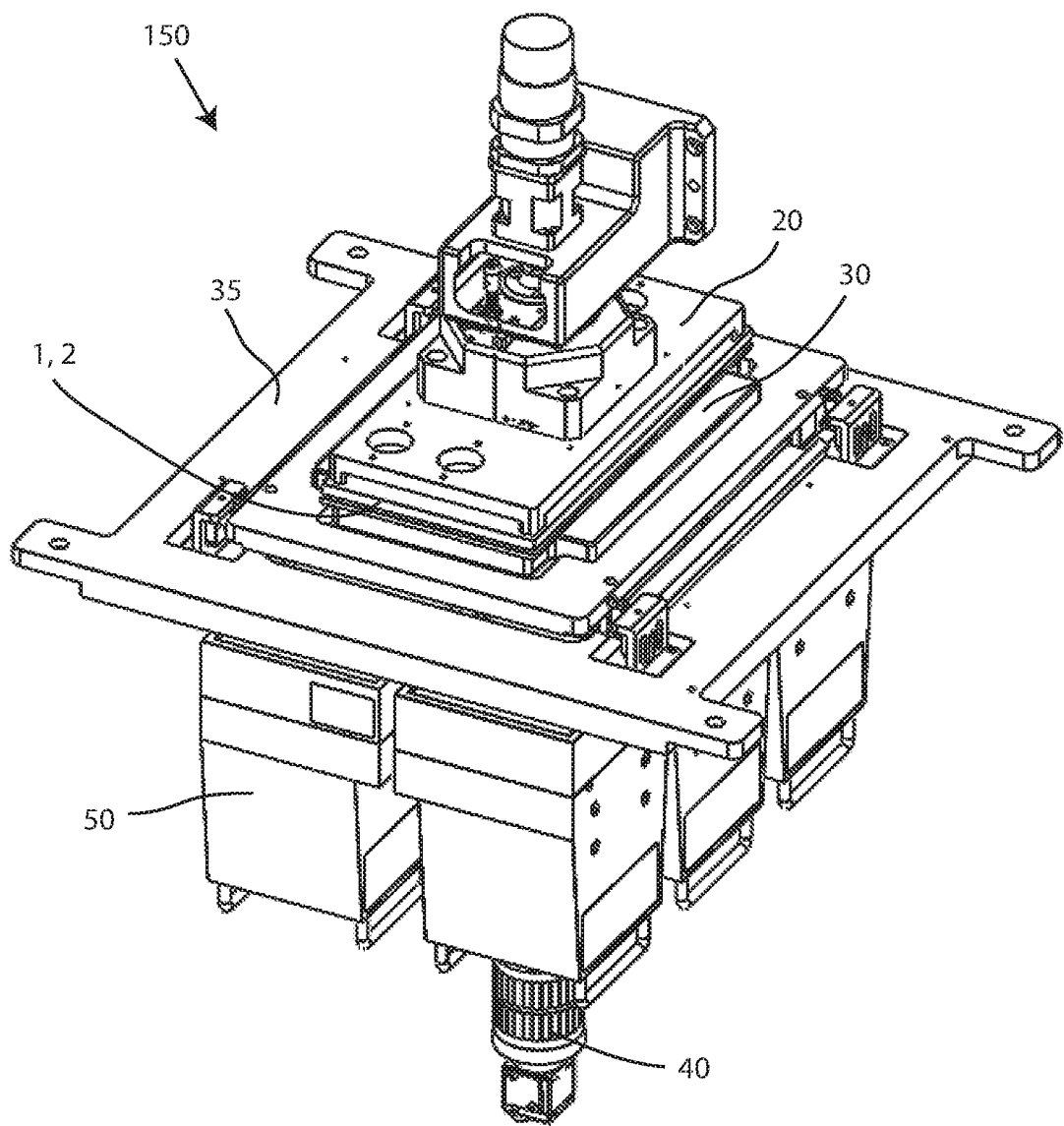
FIG. 14 depicts a perspective view from above the optical bonding assembly of the curing source in a curing position, in accordance with embodiments of the present invention.

The curing source 50 may be moveable from a first position to a second position, within the machine 10. FIGS. 4-6 depict a first position of the curing source 50. The first position of the curing source 50 may be in a position away from the datum 30, such that a field of view of the camera 40 is not blocked or impeded by the curing source 50. In an exemplary embodiment, the curing source 50 is in the first position (e.g. out of the field of view of camera 40) during the act of bringing the substrates 1, 2 together on the datum platform 32. After or in response to the substrates 1, 2 have been bonded together on the datum platform 32, and potentially after or in response to an inspection either performed automatically by the computing system 120 or manually by an operator, the curing source 50 may be moved from the first position to the second position. FIGS. 13-14 depict a second position of the curing source, wherein the curing source is in a curing position, in accordance with embodiments of the present invention. In the second position, the curing source 50 may be positioned directly underneath the datum 30, wherein UV rays emitted by the curing source 50 may pass through the transparent datum platform 32 to cure the adhesive(s) between the substrates 1, 2. The curing source 50 may move between the first position and the second position along a track 52. In some embodiments, an actuator associated with the curing source 50 may be actuated by the computing system 120 to move the curing source 50 to and from the first and second position. In the second position, the curing source 50 may be turned on via the controller 55 to emit UV light at a particular intensity and duration as needed to cure the adhesive and complete the optical bonding of the substrates 1, 2; the UV light passing through the transparent datum 30 and the transparent substrate(s).

Thus, the bonded substrates 1, 2 are cured in place. In other words, in the same machine 10, two substrates may be optically bonded and cured, without having to transport the substrates to another machine 10, or even to another location in the machine 10. The substrates 1, 2, once adhesive-to-adhesive contact is made therebetween, may remain on the datum platform 32, and the curing source may be displaced within the machine 10, to cure the adhesive in place, within the machine 10. Remaining in place on the datum platform 32 may prevent a shift or loss of positional accuracy caused by moving the uncured substrates to a different cure location. In addition, physical space on a floor is saved by not needing an additional machine (and frame) for curing the adhesive(s), as well as additional components are spared (e.g. conveyor belt to next machine) by the cure in place solution according to embodiments of the invention. Total time may also be reduced because the bonded substrates 1, 2 need not be transported or otherwise moved to another machine.

In response to a curing process being completed, the carrier 35 may be raised into the raised position shown in FIG. 8. During the raising of the carrier 35 (or alternatively the lowering of the datum 30), a holding area 37 of the carrier 35 may receive the bonded and cured substrates 1, 2 (e.g. engagement between a lip or finger extending into the opening of the holding are 37 and the bonded and cured substrate). The carrier 35 may then be moved along track 36 towards the access point 39, wherein an operator may pick up and remove the bonded and cured substrates, and load a new pair of substrates into the carrier 35.

Referring to FIGS. 1-14, embodiments of an optical bonding method may include the steps of disposing a first substrate on a transparent datum located within an interior region of an optical bonding machine, dispensing an optically clear adhesive on the first substrate, contacting the first substrate and the second substrate, causing the optically clear adhesive to flow between the first substrate and the second substrate, displaying a video of a flow of the optically clear adhesive between the first substrate and the second substrate, and curing the optically clear adhesive between the first substrate and the second substrate in the interior region of the optical bonding machine, before transporting the first substrate and the second substrate after the contacting.

Figure 15:
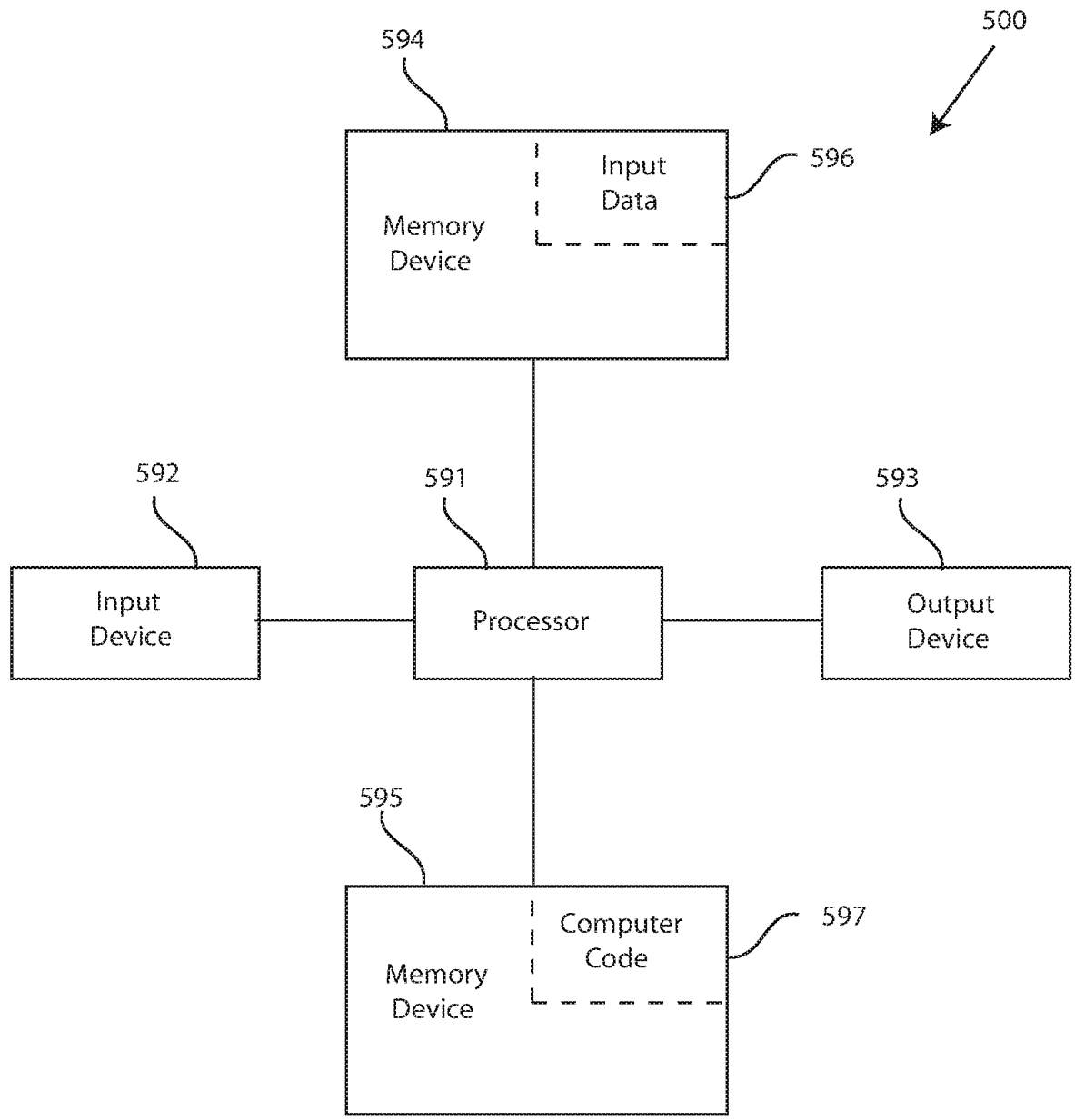
FIG. 15 depicts a block diagram of a computer system for optical bonding of FIG. 3, capable of implementing methods for optically bonding substrates, in accordance with embodiments of the present invention.

FIG. 15 depicts a block diagram of a computer system for optical bonding of FIG. 3, capable of implementing methods for optically bonding substrates, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for optical bonding, in the manner prescribed by the embodiments of FIGS. 1-14, wherein the instructions of the computer code 597 may be executed by processor 591 via memory device 595. The computer code 597 may include software or program instructions that may implement one or more algorithms for implementing the methods of optical bonding, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 15.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 3.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to an automated optical bonding systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor (s) 591, wherein the processor(s) carry out instructions contained in the computer code 597 causing the computer system to perform an automated optical bonding process using components of machine 10. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of optical bonding. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for optical bonding.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The claims are as follows:

1. An optical bonding machine comprising:
   a transparent datum, the transparent datum located within an interior region of the optical bonding machine, wherein the transparent datum supports a first substrate;
   a robotic placement head, the robotic placement head configured to pick up a second substrate and place the second substrate into contact with the first substrate, on the transparent datum; and
   a camera positioned with respect to the transparent datum such that a field of view of the camera encompasses a center portion of the first substrate when the first substrate is supported on the transparent datum, the camera capturing a video of a flow of an optically clear adhesive between the first substrate and the second substrate;
   wherein the video is displayed for providing a real-time visual of the optical bonding process.

2. The optical bonding machine of claim 1, wherein the video is displayed on a display operably coupled to the optical bonding machine.

3. The optical bonding machine of claim 1, wherein the video is used for providing a real-time visual feedback when a controller is being operated to manually lower the robotic placement head to optically bond the first substrate and the second substrate.

4. The optical bonding machine of claim 1, wherein the first substrate is an electrically active display and the second substrate is a protective cover glass for the electrically active display.

5. The optical bonding machine of claim 1, wherein the transparent datum includes a raised portion.

6. The optical bonding machine of claim 1, further comprising: a carrier having two holding areas, the two holding areas accommodating the first substrate and the second substrate, wherein the carrier moves from a first position to a second position to load the first substrate and the second substrate into the optical bonding machine.

7. The optical bonding machine of claim 1, wherein the optical bonding process is performed at atmospheric pressure.

8. An optical bonding machine comprising:
   a transparent datum, the transparent datum located within an interior region of the optical bonding machine, wherein the transparent datum supports a first substrate;
   a robotic placement head, the robotic placement head configured to pick up a second substrate and place the second substrate into contact with the first substrate, on the transparent datum; and
   a curing source disposed proximate the transparent datum, the curing source emitting UV rays that pass through the transparent datum and a center portion of the first substrate to cure an optically clear adhesive between a bonded substrate comprising the first substrate, the optically clear adhesive, and the second substrate;
   wherein the bonded substrate is cured while remaining on the transparent datum.

9. The optical bonding machine of claim 8, wherein the curing source is moved from a first position to a second position within the optical bonding machine, the first position being a position out of a field of view of a camera disposed underneath the transparent datum, and the second position being in a curing position directly underneath the transparent datum.

10. The optical bonding machine of claim 8, further comprising a curing source controller, the curing source controller being located within the optical bonding machine and providing power to the curing source.

11. The optical bonding machine of claim 8, wherein the bonded substrate is cured at atmospheric pressure, within an interior region of the optical bonding machine.

12. The optical bonding machine of claim 8, further comprising: a carrier having two holding areas, the two holding areas accommodating the first substrate and the second substrate, wherein the carrier moves from a first position to a second position to load the first substrate and the second substrate into the optical bonding machine.

13. The optical bonding machine of claim 8, wherein the first substrate is an electrically active display and the second substrate is a protective cover glass for the electrically active display.

14. The optical bonding machine of claim 8, wherein the transparent datum includes a raised portion.

15. An optical bonding method comprising:
   disposing a first substrate on a transparent datum located within an interior region of an optical bonding machine;
   dispensing an optically clear adhesive on the first substrate;

contacting the first substrate and the second substrate, causing the optically clear adhesive to flow between the first substrate and the second substrate; and displaying a video of a flow of the optically clear adhesive between the first substrate and the second substrate as captured by a camera positioned with respect to the transparent datum such that a field of view of the camera encompasses a center portion of the first substrate when the first substrate is supported on the transparent datum.

16. The optical bonding method of claim 15, further comprising: curing the optically clear adhesive between the first substrate and the second substrate in the interior region of the optical bonding machine, before transporting the first substrate and the second substrate after the contacting.

17. The optical bonding method of claim 15, wherein the camera is disposed underneath the transparent datum within the interior region of the optical bonding machine.

18. The optical bonding method of claim 15, further comprising: applying at least a dot of optically clear adhesive on the second substrate, while the second substrate is retained by a robotic placement head, to promote an adhesive-to-adhesive contact at an initial contacting.

19. The optical bonding method of claim 15, further comprising: inspecting the bonded substrates for a presence of defects, wherein the inspecting includes examining a video or image of the bonded substrates captured by a camera positioned beneath the first substrate.

20. The optical bonding method of claim 15, wherein the method is performed at an atmospheric pressure.

* * * * *